United States Patent [19]

Thompson

[11] 4,136,900

[45] Jan. 30, 1979

[54] SPREADER DEVICE WITH DISPOSABLE BAGS

[76] Inventor: Alfred L. Thompson, 70 W. 95th St., New York, N.Y. 10025

[21] Appl. No.: 845,297

[22] Filed: Oct. 25, 1977

[51] Int. Cl.[2] .................................... A01K 29/00

[52] U.S. Cl. .................................... 294/19 R; 294/1 R

[58] Field of Search .................. 294/1 R, 11, 19 R, 22, 294/55, 100, 115; 224/5 B, 28 A

[56] References Cited

U.S. PATENT DOCUMENTS

| | | | |
|---|---|---|---|
| 625,469 | 5/1899 | Schepers | 224/28 A X |
| 723,296 | 3/1903 | Neumann | 294/22 |
| 2,989,334 | 6/1961 | Browne | 294/19 R |
| 3,446,525 | 5/1969 | Jones | 294/19 R |
| 3,786,780 | 1/1974 | Pezzino | 294/19 R X |
| 3,819,220 | 6/1974 | Bredt | 294/19 R |
| 3,868,135 | 2/1975 | Magliaro | 294/19 R X |
| 4,010,970 | 3/1977 | Campbell | 294/19 R |

*Primary Examiner*—Johnny D. Cherry

*Attorney, Agent, or Firm*—Posnack, Roberts, Cohen & Spiecens

[57] ABSTRACT

For the entrapment of animal feces and other miscellaneous objects, there is provided an apparatus including a spreader which is used in connection with disposable bags in which animal feces or other objects may be entrapped for sanitary disposal or otherwise. The spreader is mounted on an elongated support which also supports a trigger and handle arrangement. A unit is provided which converts the longitudinal force generated by the trigger into pivotal movement of arms of the spreader in a plane perpendicular to the longitudinal force. A loop is mounted at one end of the elongated support and adjacent the trigger and handle arrangements so that the combination can be supported by one arm and hand of the user.

8 Claims, 9 Drawing Figures

SPREADER DEVICE WITH DISPOSABLE BAGS

FIELD OF INVENTION

This invention relates to article entrapment apparatus and, more particularly, to apparatus for the disposal of animal feces and/or other miscellaneous items.

BACKGROUND

With the increased ownership of pets and the increased demand for the cleanliness of streets and sidewalks particularly in urban areas, there has arisen the need for devices capable of disposing of animal feces in a sanitary manner. It is preferable that such devices be of a type which is conveniently storable but, more importantly, that it be easily useable so as to promote the use thereof on a wide and all encompassing scale.

SUMMARY OF INVENTION

It is an object of the invention to provide an approved apparatus for the disposal of animal feces and/or other miscellaneous objects.

It is a further object of the invention to provide an improved sanitation device.

It is yet another object of the invention to provide improved means for improving the cleanliness of streets and sidewalks particularly in urban areas.

Another object of the invention relates to the provision of a santitation and/or disposal apparatus which is readily used and which may in fact be used by only the operation of one hand and arm of the user.

Still another object of the invention relates to the provision of an improved apparatus which has an interesting manner of use so as to permit of promoting its use throughout the population at large.

A further object of the invetnion relates to the fact that the apparatus of the invention is economical both as regards its manufacture and purchase.

Still another object of the invention is to provide an improved apparatus of the above-noted type which is easily stored.

A further object of the invention is to provide an improved apparatus of the above-noted type which employs disposable bags.

In achieving the above and other of the objects and features as well as advantages of the invention there is provided generally an apparatus comprising a support, receptacle means having open and close conditions, spreader means supporting the receptacle means on said support and operable to open and close said receptacle means, and control means on said support means at a position remote from said receptacle means to control said spreader means, said receptacle means being detachable from said spreader means.

As a further feature of the invention there is additionally provided forearm engaging means on the support to accommodate the forearm of a user with the corresponding hand of the user on the foresaid control means. In accordance with a particular embodiment of the invention the aforesaid forearm engaging means may include a loop mounted on the foresaid support. The control means may for example include a handle and a trigger juxtaposed to each other on said support and further juxtaposed with respect to the loop.

In accordance with the preferred embodiment of the invention said support may be an elongated rod. Furthermore, said spreader means may include parallel arms and said receptacle means may include a receptacle with channels thereon, said arms fitting into said channels.

The apparatus of the invention may furthermore be provided with coupling means coupling the foresaid control means to said spreader means to operate the latter. Said control means provides a linear force and said spreader means operates with a pivotal motion in a planar perpendicular to said linear force. The coupling means converts the linear force of the control means into the pivotal motion of the spreader means.

The apparatus of the invention may moreover be provided with an elongated member within the aforesaid rod connected to the said trigger and longitudinally displaceable thereby. Means will be provided connecting this member to the aforesaid arms and converting the longitudinal displacement of said member into pivotal movement of said arms in opposite directions perpendicular to the aforesaid longitudinal displacement.

The receptacle means may preferably be a disposable bag with closed sides and an open mouth. Means may be provided to seal the bag closed as will be described in greater detail hereinunder. Alternatively, the receptacle means may have the form of a sling with opposed closed sides and opposed open sides such as to be structured with a U-shaped profile.

It is contemplated within the scope of the invention that the structure be manufactured independently of the receptacle means so that for example, it may be possible to supply the bags separately or as replacement parts so that the structure can be used over and over again. In such event invention is deemed to reside in the spreader structure alone and in the receptacle structure alone as well as in combination with one another.

Other objects, features and advantages of the invention as well as further aspects thereof will be apparent from the detailed description which follows hereinafter as illustrated in the accompanying drawing.

DETAILED DESCRIPTION

As has been indicated hereinabove the invention provides an apparatus comprising a support, a receptacle means having open and closed condition, spreader means supporting the receptacle means on said support and operable to open and close said receptacle means, and control means on said support means at a position remote from said receptacle means to control said spreader means, said receptacle means being detachable from said spreader means.

Figure 1:
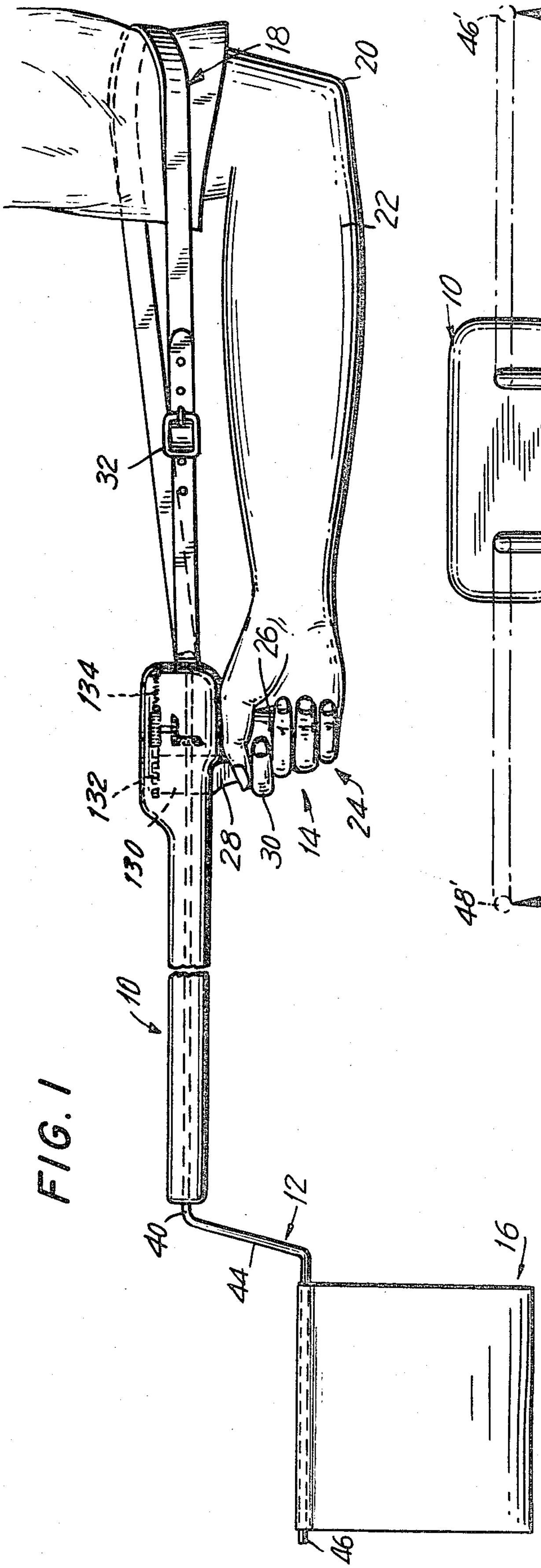
FIG. 1 is a side view of a spreader device provided with a disposable bag as in accordance with a preferred embodiment of the invention.

With reference to FIG. 1 the various parts of the apparatus mentioned hereinabove will be readily seen. More particularly, the apparatus in FIG. 1 includes a support means 10, a spreader means 12, a control means 14 and a receptacle means 16. The control means 14 is located at a position on the support means 10 which is remote from the receptacle means 16. This provides that the hands of the operator will be remote from the container means and thereby remote from the articles or items which are intended to be entrapped in the receptacle means. This contributes generally to the sanitary aspect of the apparatus of the invention.

Further provided in accordance with a feature of the invention is a forearm engaging means 18 which as shown engages over the elbow 20 on the forearm 22 of the user with the hand 24 of the operator positioned on the handle 26 mounted on support means 10 and constituting a part of the control means which moreover includes a trigger 28 pivotably mounted on the support means 10. The handle 26 and trigger 28 are juxtaposed to each other on the support means 10 in conventional cooperative relationship so that the forefinger 30 of the hand of the operator can be used to control the operation of trigger 28. Provision of the forearm engaging means 18 permits the apparatus to be readily carried and moreover it permits the device of the invention to be operated by only one arm and one hand of the user. The loop braced against the top portion of elbow 20 will have a distance to the handle 26 from the apex of the forearm engaging means 18 so that the entire structure can be easily braced and operated. For this purpose the structure of the invention is purposefully manufactured of relatively light materials, such as aluminum, plastic and so forth.

The forearm engaging means is provided in the form of a loop in its preferred form. This loop can be fabricated of solid materials such as plastic or aluminum but preferably the loop may be further fabricated from a strap of leather provided with a buckle 32 or the like which will permit adjustment of the length of this loop. Alternatively, or as part of the loop as described hereinabove rubber may be employed in the fabrication of means 18 so as to permit a natural adaptation of the loop to the length of the forearm of the user. As an alternative, the loop may be connected to the support 10 by a spring coupling device fabricated for example, in the form of a helical spring.

The support 10 may preferably be in the form of a hollow elongated rod. As noted hereinabove, the rod may be fabricated for example of aluminum or plastic. Contained therein are the means for converting the longitudinal force generated by trigger 28 into a pivotal movement of the arms of the spreader device 12 as will be described in greater detail hereinafter. Each of the spreader arms, however, are employed to engage a receptacle 16 which preferably is constituted by a disposable bag fabricated, for example, of polyvinyl chloride or some similar material of low cost which is readily susceptible of being disposed of without creating any financial hardship for the owner and operator of the device.

Figure 2:
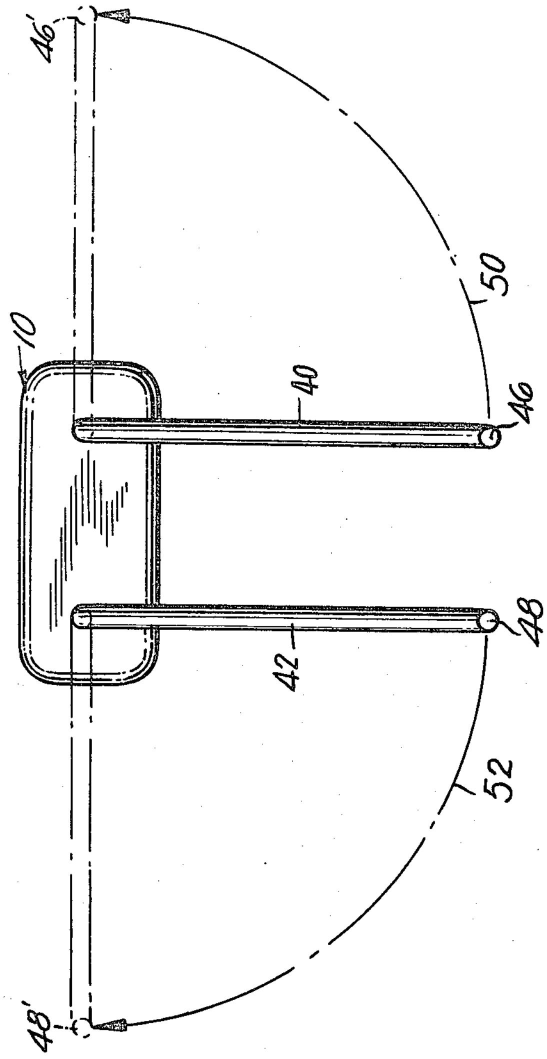
FIG. 2 is a front view of the spreader device of FIG. 1, diagrammatic in form, illustrating the operation of the spreader device.

As has been noted hereinabove, the spreader device 12 consists of two arms. These arms are indicated in FIG. 2 at 40 and 42. They include (see also FIG. 1) two inclined parts indicated at 44 which terminate in arms 46 and 48 which are parallel to one another and which extend in parallel relationship to the rod constituting support 10. These arms are supported for pivotal motion to positions 46' and 48' as indicated by arrows 50 and 52. In executing such a motion they form the function of opening and closing receptacles or bags as will become more apparent hereinunder. It will be noted that the arms 46 and 48 as well as the parts 40 and 42 to which they are connected may for example be fabricated of a relatively strong material such as steel rod or wire. They are not of such length as to cause a weight problem relative to the overall constitution of the apparatus.

Figure 3:
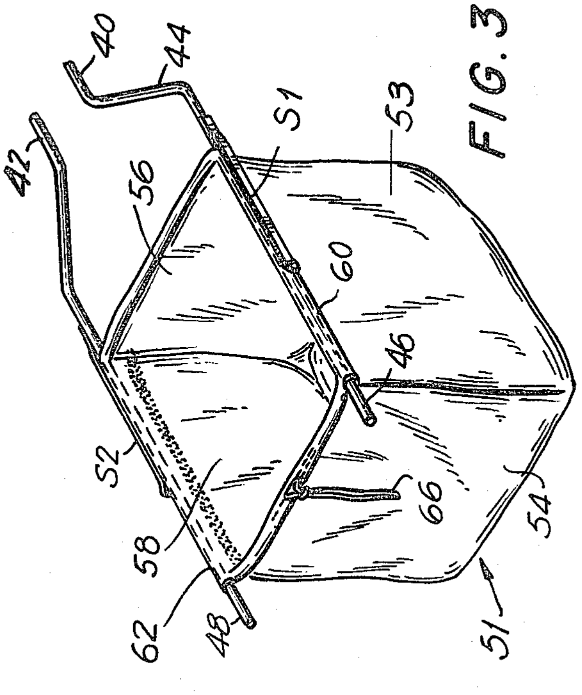
FIG. 3 is a perspective view, partially diagrammmatic, illustrating the provision of one form of disposable bag provided in accordance with the invention.

A receptacle or bag employed in accordance with the invention is shown in open condition in the fragmentary perspective view in FIG. 3. More particularly, there is shown in FIG. 3 a disposable bag 51 constituting the receptacle employed in accordance with this embodiment of the invention. The bag illustrated in FIG. 3 has closed sides such as indicated at 53 and 54 in FIG. 3. There is a closed side opposed to side 53 and another closed side opposed to side 54. These are indicated at 58 and 56 respectively.

The bag 51 is provided with parallel channels 60 and 62, there being formed by seams arranged at the top of the bag so as to form two parallel channels into which the arms 46 and 48 may respectively be passed. These arms are shown in spread a-part condition whereby the bag is maintained in open position adapted to receive the items intended to be disposed of in a sanitary fashion.

The tops of such bags may be provided with a sealing substance. This sealing substance may be for example, a pressure responsive adhesive or Velcro so that the top of the bag may be readily sealed in closed condition. As an alternative a separate supply of tape can be provided having one surface thereof formed with pressure responsive adhesive so that the bag can be sealed shut in still a further manner.

The removal of the bag in which an article or item has been entrapped may constitute under certain conditions a certain santitary problem. For this reason there is fixed to the bag a cord or string 66 fabricated of natural or synthetic materials which operates as a handle and permits the disposable bag to be removed easily and readily from arms 46 and 48 without the operator having to contact the bag directly. This avoids the possibility of soiling the user's hands with the content of the bag 51 even in the event that some of such contents have soiled the outer surface of the bag.

Figure 4:
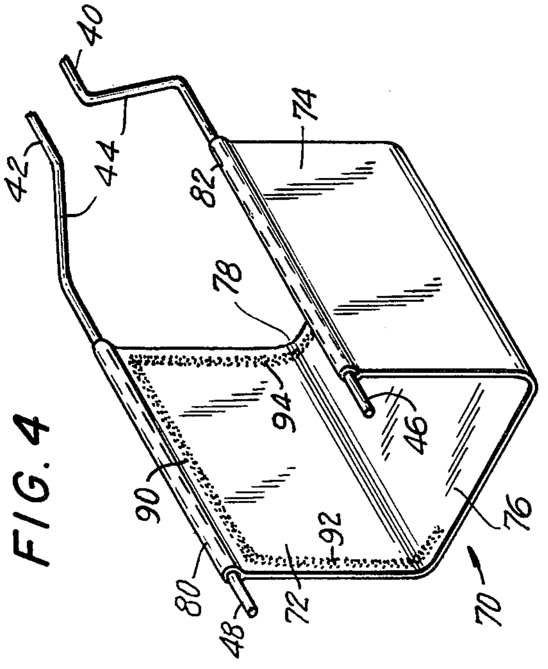
FIG. 4 is a variation of FIG. 3 illustrating a further embodiment of the invention.

A further form of receptacle is shown in FIG. 4 in the form of sling 70. This sling has two closed sides 72 and 74 which are in opposed relationship and furthermore has two opened sides 76 and 78 also in opposed relationship. The sides 72 and 74 are provided with two parallel channels 80 and 82 in the manner indicated generally hereinabove to accommodate the insertion of arms 46 and 48. The arms 46 and 48 are illustrated in their spread a-part positions thereby enabling the receipt of animal feces or the like. The arrangement is such that the animal feces may be caught on deposit and intercepted before reaching the ground. The sling arrangement illustrated in FIG. 4 may be provided with an adhesive such as mentioned hereinabove with respect to FIG. 3, this adhesive being located at positions 90, 92 and 94 to provide a well sealed receptacle after the article to be deposited has been entrapped therein.

Figure 5:
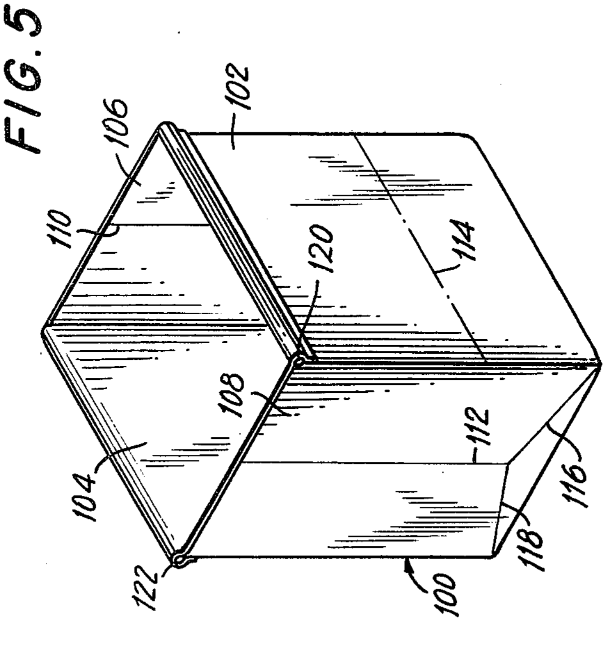
FIG. 5 illustrates a further disposable bag which can be employed in accordance with the provisions of the invention.

A further form of receptacle is illustrated in FIG. 5 wherein is shown a receptacle or bag 100 having sides 102, 104, 106 and 108. Sides 106 and 108 are provided with pleats 110 and 112 to permit folding the bag in conventional manner as is assisted by the provision of, for example, folds 114, 116 and 118.

This embodiment of the invention is moreover provided with channels 120 and 122 which are parallel channels permitting the insertion of arms 46 and 48 to permit operation in the manner indicated generally hereinabove.

The bags of the invention are preferably fabricated of a disposable material such as, for example, polyvinyl chloride or thin gauze which as aforesaid will permit the disposal of the same in a manner which causes no financial hardship to the owner and/or user of the device.

Figure 7:
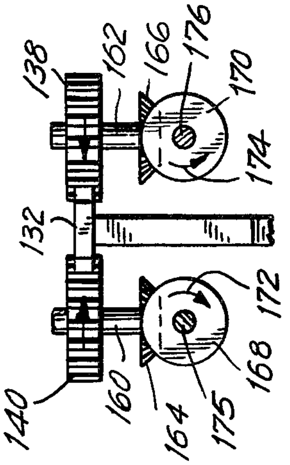
FIG. 7 is an end view of the structure illustrated in FIG. 6.
Figure 8:
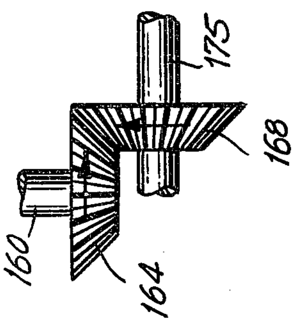
FIG. 8 is a side view of a fragmentary part of the apparatus illustrated in FIG. 7 intended to clarify the relationship of certain of the parts therein.
Figure 6:
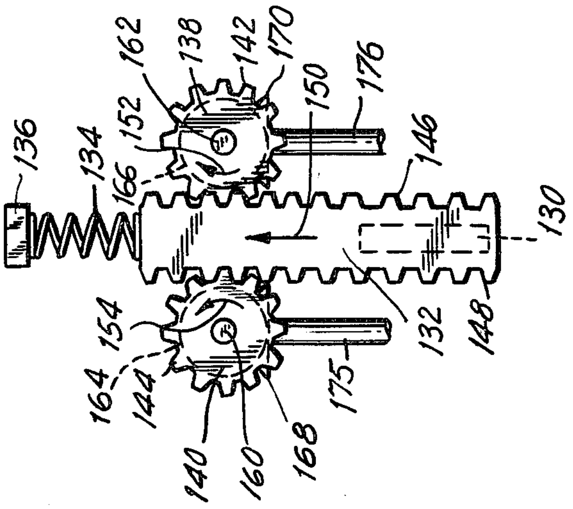
FIG. 6 is a top view of a concealed portion of the apparatus of FIG. 1 provided for the purpose of converting longitudinal movement of the trigger into pivotal movement of the spreader mechanism.

As has been discussed hereinabove, the use of trigger 28 (FIG. 1) permits pivotal movement of the arms 46 and 48 in directions 50 and 52 which are not only parts of a circle but which moreover are aligned in planes which are perpendicular to the longitudinal movement generated by trigger 28. To permit the conversion of this longitudinal movement into the aforesaid pivotal motion, there is concealed in the rod or tube constituting support 10 a unit such as illustrated in FIGS. 6–8. More particularly, there is connected to the trigger 28 link 130 or the like which in turn is connected to a rack 132 in turn connected by a spring 134 to a block 136 fixed at one end of the support 10. The spring 134 preferably operates to load the device such that the arms 46 and 48 are in their closest juxtaposed positions. Thus, operation of the trigger will be intended to bring the arms 46 and 48 from their juxtaposed positions to the opened positions indicated at 46' and 48'.

In engagement on opposite sides of the rack 132 are gears 138 and 140 provided with suitable teeth 142 and 144 to engage with the teeth 146 and 148 on rack 132.

Movement of the rack 132 in the direction of arrow 150 as caused by displacement of link 130 by operation of trigger 28 (FIG. 1) will cause the gears 138 and 140 to rotate in opposite directions as indicated by arrows 152 and 154. As seen in FIG. 7 this in turn rotates shafts 160 and 162 which rotates bevel gears 164 and 166. This in turn rotates cooperating bevel gears 168 and 170 as shown by arrows 172 and 174, this rotation being in opposite directions. These directions correspond to the directions of arrows 50 and 52 in FIG. 2, whereof parts 40 and 42 are connected to shafts 175 and 176 driven by gears 168 and 170 as described hereinabove.

FIG. 8 shows generally the relationship of one of the sets of bevel gears, such as for example, bevel gear 164 driving bevel gear 168, the bevel gear 164 being driven through the intermediary of shaft 160.

From the description of the unit in FIGS. 6–8 it is seen how the longitudinal or linear displacement generated in trigger 28 is converted into opposite pivotal motions in a plane or planes which are aligned perpendicular to the aforesaid longitudinal displacement which is characterized by the arrow 150 in FIG. 6.

It will be obvious that various features may be added to the structure as indicated hereinabove. Thus, for example, it may be possible to add spring clips S1 and S2 to the arms 46 and 48 to hold the associated disposable bag more firmly on these arms. Since the spring clips are of a springlike material relatively weak in strength the provision of these clips will not prevent the ready removal of the filled bag from the arms 46 and 48.

Figure 9:
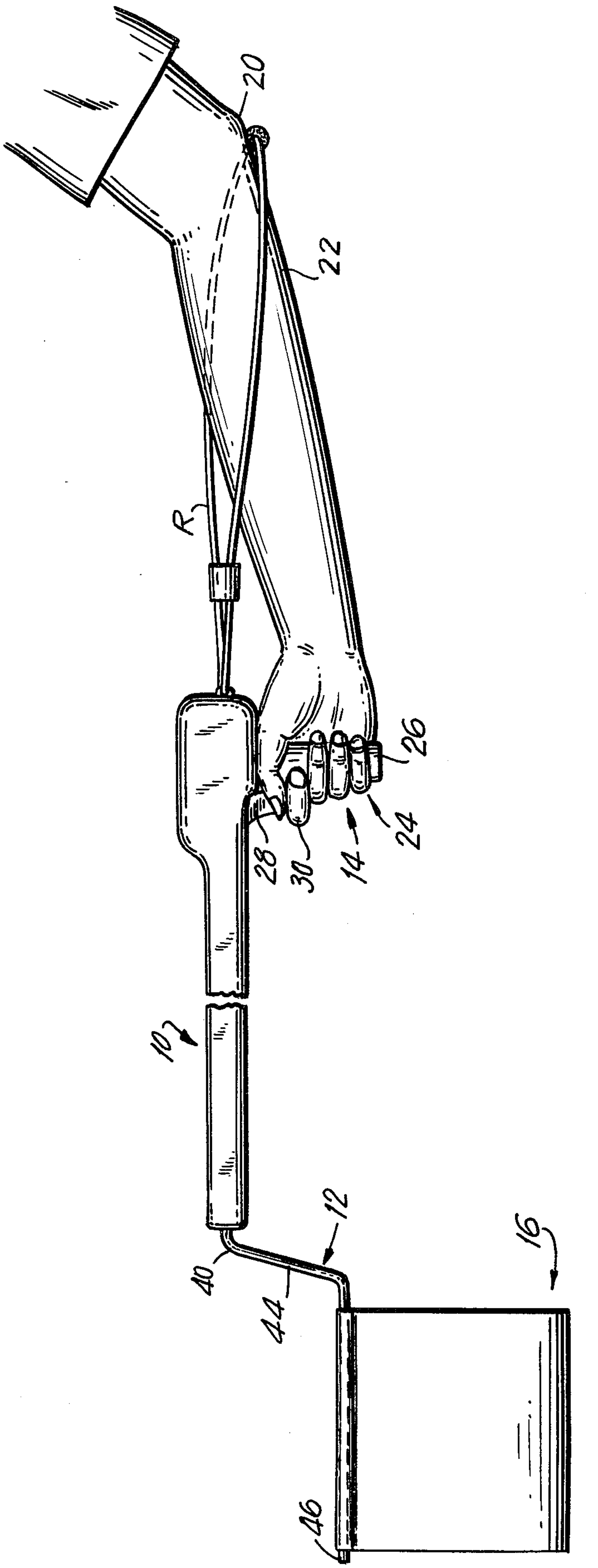
FIG. 9 is a view corresponding to FIG. 1 of a modification.

FIG. 9 illustrates a modification of FIG. 1 in accordance with which a metal loop R is attached to the device of the invention. The metal loop may be either rigidly affixed to the device or pivotally connected thereto. The loop R will encircle the forearm and will come to rest beneath the elbow 20 of the user. It will constitute a brace whereby the device for the invention may be supported in position for use as illustrated. It is to be noted that while the loop R has been described above as being of metal, the loop may alternately be of other solid or rigid material such as plaster or the like.

There will now be obvious to those skilled in the art many modifications and variations of the constructions set forth hereinabove. These modifications and variations will not depart from the scope of the invention if defined by any one one of the following claims.

What is claimed is:

1. Apparatus comprising a support, receptacle means having open and closed conditions, spreader means supporting the receptacle means on said support and operable to open and close said receptacle means, control means on said support at a position remote from said receptacle means to control said spreader means, said receptacle means being detachable from said spreader means, and forearm engaging means on said support to accommodate a forearm of a user with the corresponding hand of the user on said control means, said control means including a handle and a trigger juxtaposed with respect to each other on said support, said support being an elongated rod, said spreader means including straight parallel arms outside of said support, inclined arms respectively connected to said parallel arms, and further arms connected to said inclined arms and extending into said support, said receptacle means including a receptacle with channels thereon, said straight parallel arms fitting into said channels, coupling means coupling said control means to said further arms to operate the latter, said control means providing a linear force, said further arms operating with a pivotal motion, said coupling means converting the linear force into said pivotal motion about an axis parallel to said support.

2. Apparatus as claimed in claim 1 wherein said receptacle means is a disposable bag with closed sides and open mouth.

3. Apparatus as claimed in claim 2 comprising means to seal said bag closed.

4. Apparatus as claimed in claim 2 wherein the bag has two opposed closed sides and two opposed open sides.

5. Apparatus as claimed in claim 4 comprising means on the bag to seal the same shut.

6. Apparatus as claimed in claim 2 comprising a cord on the bag to operate as a handle to remove the bag from said arms.

7. Apparatus as claimed in claim 1 wherein said coupling means includes a rack coupled to and driven by said trigger and pinions engaging said rack and driven thereby, said pinions being coupled to said further arms.

8. Apparatus as claimed in claim 1 comprising resilient clips on said straight parallel arms to retain said receptacle means thereon.

* * * * *